United States Patent [19]
Volz et al.

[11] Patent Number: 5,185,681
[45] Date of Patent: Feb. 9, 1993

[54] THERMAL OFFSET COMPENSATION FOR HIGH DENSITY DISK DRIVES

[75] Inventors: Leroy A. Volz, Northridge; Haim Nissimov, West Hills, both of Calif.

[73] Assignee: Seagate, Scotts Valley, Calif.

[21] Appl. No.: 591,037

[22] Filed: Sep. 28, 1990

[51] Int. Cl.$^5$ ............................................. G11B 5/596
[52] U.S. Cl. ............................ 360/77.05; 360/77.04; 360/77.07
[58] Field of Search ............... 360/77.02, 77.04, 77.05, 360/77.07, 77.08, 77.11

[56] References Cited

U.S. PATENT DOCUMENTS

| | | | |
|---|---|---|---|
| 4,530,020 | 7/1985 | Sutton | 360/77.08 |
| 4,782,404 | 11/1988 | Baba | 360/77.07 |
| 4,809,120 | 2/1989 | Ozawa | 360/77.08 |
| 4,982,295 | 1/1991 | Yakuwa et al. | 360/77.04 |
| 5,040,084 | 8/1991 | Liu | 360/77.04 |
| 5,053,897 | 10/1991 | Ikeshita | 360/77.04 |
| 5,105,318 | 4/1992 | Tsuneta et al. | 360/77.04 |

FOREIGN PATENT DOCUMENTS

| | | | |
|---|---|---|---|
| 55-150161 | 11/1980 | Japan | 360/77.04 |
| 59-87669 | 5/1984 | Japan | 360/77.05 |
| 62-33376 | 2/1987 | Japan | 360/77.04 |
| 62-129981 | 6/1987 | Japan | 360/77.05 |

OTHER PUBLICATIONS

A. Paton, IBM Technical Disclosure Bulletin, vol. 17, No. 6, Nov. 1974, "Correction of Data Track Misregistration in . . . " pp. 1781-1783.

Primary Examiner—Joseph L. Dixon
Assistant Examiner—David L. Robertson
Attorney, Agent, or Firm—Kelly, Bauersfeld & Lowry

[57] ABSTRACT

A thermal offset compensation system is provided for use in a computer disk drive unit have a dedicated servo surface on one of a plurality of memory storage disks. The disk drive unit has a plurality of electromagnetic heads displaced as a group relative to respective storage surfaces on the disks to read and/or write data in concentric tracks. One of the heads comprises a servo head for reading servo data prerecorded onto the dedicated servo surface to align the remaining heads relative to corresponding cylinders of data tracks. Thermally induced offsets of the data heads relative to the servo head are measured on one or more calibration cylinders located in the inner and outer guard bands of each storage surface. The average offset of the data heads, taken collectively, is determined and subsequently compensated-for when any data head is utilized to read or write data on a selected track. The thermal compensation offset is determined during a spin-up operation of the disk drive unit, and then periodically thereafter upon receipt of any host command by the disk drive unit.

10 Claims, 6 Drawing Sheets

THERMAL OFFSET COMPENSATION FOR HIGH DENSITY DISK DRIVES

BACKGROUND OF THE INVENTION

This invention relates generally to computer disk drive units and related control systems for use in a personal computer environment or the like. More particularly, this invention relates to a system capable of periodically monitoring and compensating for thermal offset of one or more data read/write heads relative to a servo head in a high density disk drive unit, in a manner minimizing both read/write error and functional time requirements for the compensation calculation and application.

In recent years microcomputer equipment such as personal or desk top computers have become extremely popular for a wide range of business, educational and recreational uses. Such computers typically include a main central processor having one or more memory storage disks for storage of data. The storage disk or disks are commonly provided as part of a so-called Winchester disk drive unit, sometimes referred to as a "hard" disk, wherein the storage disks are rotatably supported within a substantially sealed housing. The disks are rotatably driven in unison by a small spindle motor, and one or more electromagnetic heads are displaced by a head actuator assembly to traverse surfaces of the disks for purposes of reading and writing data. Such data is recorded onto magnetizable surfaces or surface films of the disks in the form of data bits located within narrow, closely spaced concentric tracks on the disks. Accordingly, for any given disk drive unit the total memory storage capacity is directly proportional to the number of disks as well as the number of tracks on each disk.

In normal operation, a system controller of the main central processor has the capability to identify data stored on the disks, typically through the use of directory name, file name, and/or track address information. When reading of data at a specified data track is desired, the system controller displaces the head or heads to the desired position by supplying appropriate command signals to operate the head actuator assembly. Alternatively, when data recording or writing is desired, the system controller operates the actuator assembly to align a selected head within a vacant data track. In either case, the head actuator assembly is commanded to displace the head or heads through a generally radial path relative to the disk for moving each head from alignment with a previously selected track to alignment with the newly selected destination track. Such movement of the head is normally referred to as a "seek" step.

In one known servo seeking and tracking system, each surface of each disk includes servo information prerecorded within radially spaced servo segments or sectors. This type of servo system, commonly known as an "embedded" servo system, provides data which is read by the operating head for purposes of seeking and tracking within a designated data track. During head traverses to seek a new specified data track, the head responds to embedded track address information within the servo sectors to identify a specified destination track. While such embedded servo systems have functioned generally satisfactorily, such systems inherently include track seek or access speed limitations due primarily to the limited sample rate at which the head can read and respond to servo information within the servo sectors. This inherent seek speed limitation is rendered more significant when relatively high track densities are used. Moreover, an embedded servo system fixes the number of available data and servo sectors in a manner which is incompatible with some types of controller surfaces.

So-called "dedicated" servo surface systems are also generally known in the art, wherein servo seeking and tracking information is prerecorded onto one surface of a memory storage disk in a disk drive unit having multiple disks. The servo seeking and tracking information is detected by an associated servo head for purposes of displacing and aligning a group of data heads with a designated data track, or to identify track crossings during a seek/access step. Such dedicated servo surface systems are preferred in certain multiple disk microcomputer applications since they can provide an overall increased data storage capacity to the disk drive unit.

For optimum disk drive unit performance it is desirable to displace the head or heads through each seek step in a minimum time period consistent with accurate head alignment with the destination track. In dedicated servo surface systems each of the data heads are displaced coextensively with the servo head for alignment with a designated "cylinder" address (a cylinder address being the alignment of all data heads over a selected track on the designated servo surface). Data applied to a particular platter or disk surface by any one of the data heads may then be indexed at a particular cylinder address. However, track seek/access errors can arise as a result of thermal expansion of the actuator arms and other mechanical components of the hard disk drive unit, resulting in a misalignment of the data heads relative to the servo head. In some cases, thermal expansion of the mechanical parts may cause one or more data heads to displace from the designated cylinder address sufficiently to introduce read/write error.

There exists, therefore, a significant need for a system capable of compensating for thermal offset of data heads relative to the servo head, which system is relatively simple and operates automatically to minimize thermal expansion-induced read/write error. Further, such a thermal offset compensation system is needed which is specifically designed for use in dedicated servo surface hard disk drives, and which minimally impacts the speed efficiency of the computing system. Moreover, a thermal offset compensation system is needed which is capable of calculating an initial compensation offset value upon spin-up of a disk drive unit, and thereafter periodically monitoring changes in the thermal expansion-induced offset. The present invention fulfills these needs and provides further related advantages.

SUMMARY OF THE INVENTION

A thermal offset compensation system for a computer disk drive unit is provided which measures the offsets of a plurality of data heads relative to a calibration cylinder, determines the average offset of those data heads, and then shifts them, collectively, relative to a selected data cylinder to null the average offset determined. This system minimally impacts the speed and efficiency of the disk drive unit while automatically minimizing thermal expansion-induced read/write error. The computer disk drive unit comprises a plurality of memory storage disk surfaces, each of said disk storage surfaces having aligned concentric data tracks thereon such that any data track defines a cylinder address for the disk storage surfaces collectively. A plurality of data heads are generally aligned with one another, each being in operative association with a respective disk storage surface. Means are provided for compensating for offsets of the data heads relative to a selected cylinder address. The compensating means includes means for collectively shifting the data heads relative to the selected cylinder address to null the average offset of the data heads taken collectively.

In accordance with a preferred form of the invention, a dedicated servo surface comprises one of the memory storage disk surfaces, which are arranged in a computer disk drive unit for rotation as a group about a common spindle axis. A head positioner assembly caries a plurality of electromagnetic heads in individual flux-coupled association with the disk surfaces, for example with two heads being provided on opposite sides of each memory storage disk. One of the heads comprises a servo head for reading the servo data on the dedicated servo surface, whereas the remaining heads comprise data head for reading and/or writing data relative to their respective disk surfaces. A conventional system controller operates through appropriate disk drive circuitry to command a head positioner assembly to displace all of the heads as a group with respect to the disk surfaces. The servo head tracks the servo data throughout such displacement to identify and verify the position of the servo head, thereby also identifying and verifying the position of the data heads.

The process of compensating for thermally induced offsets of the data heads relative to a selected cylinder of data tracks includes the steps of measuring the offset of each data head relative to an inner guard band calibration cylinder, and measuring the offset of each data head relative to an outer guard band calibration cylinder during a spin-up operation of the disk storage surfaces. Each of the inner and outer calibration tracks, provided on each memory storage surface at common cylinder addresses, includes a forward and reversed offset burst pattern sequentially spaced thereon and separated by an AGC (adjusted gain control) signal. The burst pattern is applied to each of the memory storage surfaces such that the collective offset of all data heads relative to the selected calibration track is determined during one revolution of the disk drive unit. The offset of any particular head is determined by comparing the forward versus reverse signal detected by the head during the calibration procedure.

The average offset of the data heads taken collectively is then determined, as well as a minimum incremental unit value, for collectively adjusting the data heads to null the average offset determined. The data heads, including the servo head, are then shifted as a group relative to the calibration cylinder to null the average offset determined. This shifting step includes the steps of alternately collectively moving the data heads the minimum incremental unit distance and then measuring the average offset of the data heads relative to the calibration cylinder until the average offset is nulled.

During a spin-up operation of the disk drive unit, the average offsets of the data heads at both the inner and outer guard band calibration cylinders are compared with one another, and a linear regression technique is utilized to vary, if necessary, the amount of offset to be applied through the range of data tracks between the calibration cylinders.

Following the initial calibration, the offset of each data head relative to the inner and outer guard band calibration cylinders is measured periodically. In particular, the offset relative to a calibration cylinder is measured only after the expiration of a predetermined time period and upon receipt of a host command by the disk drive unit. The offset applied to the data heads is changed only when the average offset changes at least by the minimum incremental unit value.

During the monitoring stage following the spin-up offset calibration, a flag is set such that the average offset of the data heads is measured with respect to the outer guard band calibration cylinder until the average offset changes at least by the minimum incremental unit value. After such a change has been detected, the flag is reset such that the average offset of the data heads is measured with respect to the inner guard band calibration cylinder until, once again, the average offset changes at least by the minimum incremental unit value. When such a condition is detected, then the flag is reset to once again cause the average offset to be determined at the outer guard band calibration cylinder, and the process repeats itself.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 9 is a schematic representation of the thermal burst pattern applied to the calibration track illustrated in FIG. 8, showing the burst pattern throughout the circumference of the calibration track.

DETAILED DESCRIPTION OF THE PREFERRED EMBODIMENT

Figure 2:
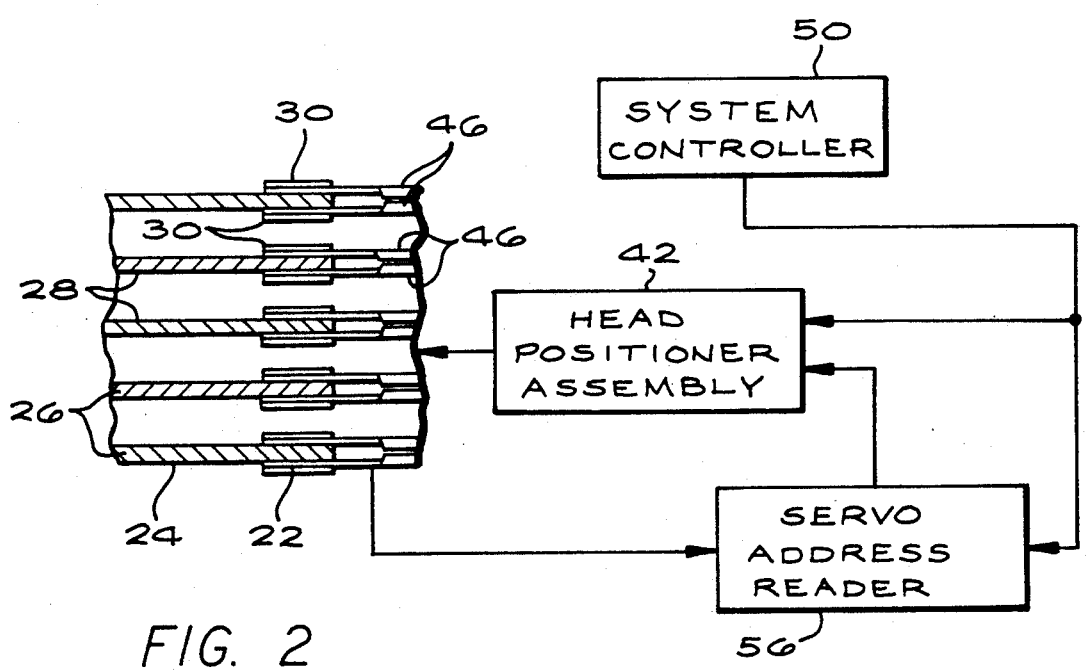
FIG. 2 is a schematic diagram illustrating multiple memory storage disks for use in the disk drive unit of FIG. 1, wherein one of the disks includes a dedicated servo surface and an associated servo head.

As shown in the exemplary drawings, a thermal offset compensation system is provided for a computer disk drive unit referred to generally in the accompanying drawings by the reference number 20. The computer disk drive unit 20 utilizes a dedicated servo head 22 (FIG. 2) for detecting servo data prerecorded onto a dedicated servo surface 24 on one side of one of a plurality of memory storage disks or platters 26. The remaining surfaces of the storage disks 26 comprise data surfaces 28 for reading and/or writing data through the use of a corresponding plurality of read/write heads 30. Each of the data surfaces 28 include a data zone 32 whereon data is stored, an inner guard band 34 and an outer guard band 36. In accordance with the invention, the thermal offset compensation system responds to prerecorded data found on the inner and outer guard bands 34 and 36 to measure thermally induced offsets between the read/write heads 30 and the servo head 22, and applies a compensating offset to the servo head 22 relative to the servo surface 24 to minimize seeking and tracking errors.

Figure 1:
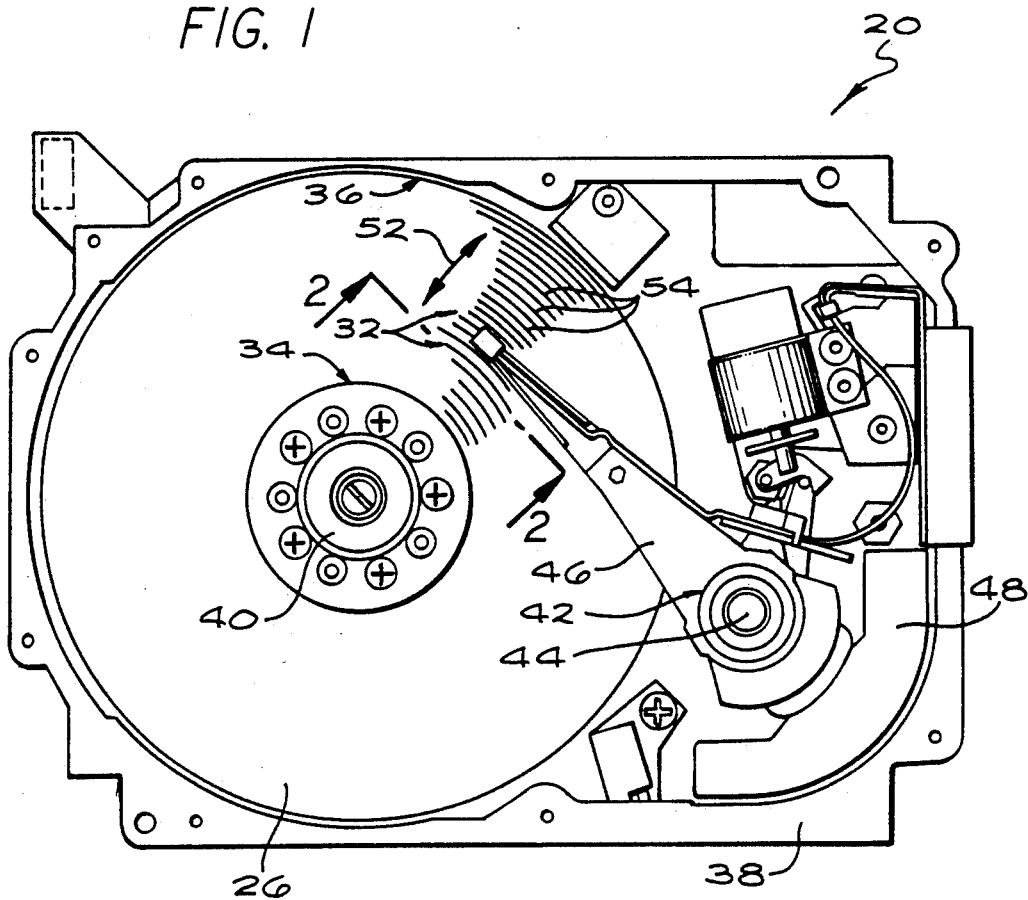
FIG. 1 is a top plan view depicting an exemplary high density computer disk drive unit of the type adapted to use a thermal offset compensation process embodying the novel features of the invention.

As shown generally in FIG. 1, the computer disk drive unit 20 comprises a so-called "hard" disk drive of the general type used in modern personal computers and the like. The disk drive conventionally includes a substantially sealed housing 38 defined by appropriate interconnected housing members to enclosed the various disk drive components. The sealed housing 38 typically has an overall size and shape with generally standardized external dimensions selected to fit within an installation envelope of limited size within the cabinet (not shown) of a central processor unit for a computer. The disk drive housing 38 encases a vertically stacked array of spaced-apart memory storage disks 26 mounted upon and rotatably driven as a group by a spindle motor 40. The memory storage disks 26 preferably have diametric sizes of about 5.25 inches or about 3.50 inches to correspond with standard disk sizes in the computer industry. The multiple disks 26 are mounted within a vertical profile permitting the disk drive unit 20 to fit within a standardized full height dimension of about 3.25 inches, or within a half height dimension of about 1.625 inches. According to a preferred disk drive geometry utilizing the thermal offset compensation system of the present invention, up to five storage disks 26 have been incorporated into a disk drive of half height dimension.

As is known generally in the art, the illustrative disk drive unit 20 includes a head positioner assembly 42 mounted within the sealed housing 38 at a position alongside the disk stack. The head positioner assembly 42 is movably supported by means of a bearing 44 or the like and in turn carries a plurality of individual, generally parallel arms 46 each having an electromagnetic read/write head 30 or 22 at the distal end thereof. One of these arms 46, such as the lowermost arm, carries the servo head 22 in close proximity with the dedicated servo surface 24 shown as the underside surface of the lowermost disk 26 in the stack. The remaining heads 30 are disposed in close, flux-coupled proximity with the respective remaining upper and lower disk surfaces, with these remaining heads 30 comprising the data heads for appropriate reading and writing of data on the their respective disk surfaces. A suitable positioner mechanism 48, such as a moving coil actuator, forms a portion of the head positioner assembly 42 and responds to commands from a system controller 50 (FIG. 2) to displace the heads 22 and 30 as a group through radial traverses relative to their respective disk surfaces, as indicated by the arrow 52 in FIG. 1. Such traversals function to align all of the heads 22 and 30 at a selected cylinder address, to align a selected data head 30 with a selected data track 54 for purposes of reading and/or writing data.

In general terms, the dedicated servo surface 24 on the lowermost disk 26 includes prerecorded servo data arranged in a predetermined pattern of bits designed to represent a unique address for each of a large plurality of concentric servo tracks. A servo address reader 56 (FIG. 2) is provided for interpreting the bit pattern comprising the servo data in a manner permitting accurate servo head seeking and tracking alignment with a specific track, and further permitting the servo head 22 to seek and align with a new track as specified by the system controller 50. Detection of the address data on the dedicated servo surface 24 permits the servo head 22 to identify and verify alignment with the new track at the conclusion of a seek step, or to correct any seeking or tracking error.

In accordance with the present invention, and as illustrated in FIGS. 3 through 9, the thermal offset compensation system is designed particularly for computer disk drive units 20 having a high density design which, therefore, may exhibit head temperature-related position offset. Such position offset is typically generated by thermal-related mechanical expansion of disk drive unit components during disk drive operation.

Figure 3:
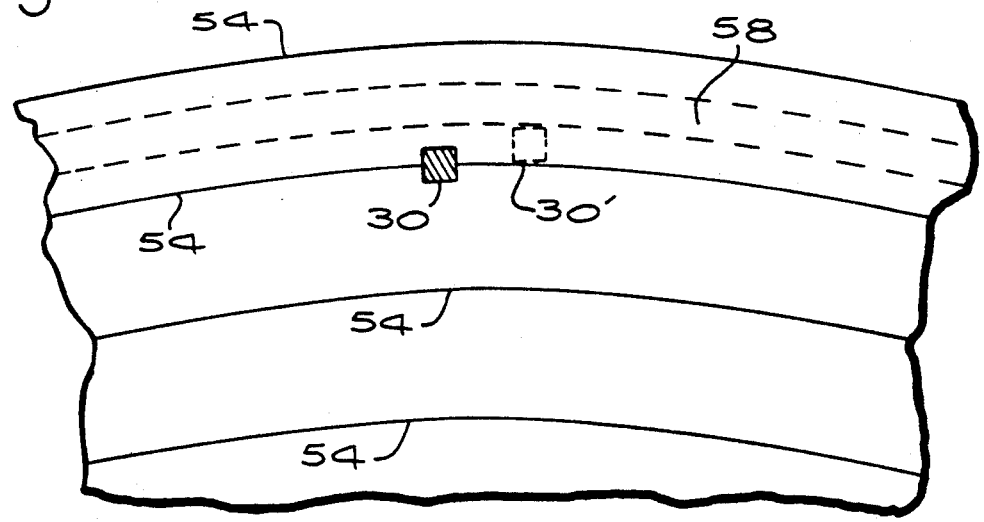
FIG. 3 is an enlarged schematic representation illustrating the ideal position of a data head relative to a data track on a platter or disk, and possible offset positioning of the data head (in phantom) caused by mechanical thermal expansion effects.

In an exemplary high density disk or platter 26, there are 1072 data tracks 54 within the data zone 32. By way of example, and without limiting the invention, the data tracks 54 are concentrically spaced from one another approximately 600 micro-inches. Ideally the data head 30 is positioned directly over a data track 54 in order to read or write data, as illustrated in FIG. 3. However, due to thermal expansion of mechanical parts within the disk drive unit 20, the data heads 30 and/or the servo head 24 may become displaced from the ideal position, as illustrated by the head 30' (shown in phantom in FIG. 3).

Magnetic data on the data surfaces 28 is applied in a manner such that an offset head 30' can read such data so long as the offset displacement is limited. In the exemplary embodiment, so long as the servo and/or data heads 24 and 30 are not displaced more than 200 micro-inches from the actual position of the selected data track 54, the disk drive unit 20 will operate in a normal manner. However, a displacement greater than 200 micro-inches places the data head over a "dead zone" 58 provided between adjacent data tracks 54, and can result in disk drive unit malfunction.

Figure 4:
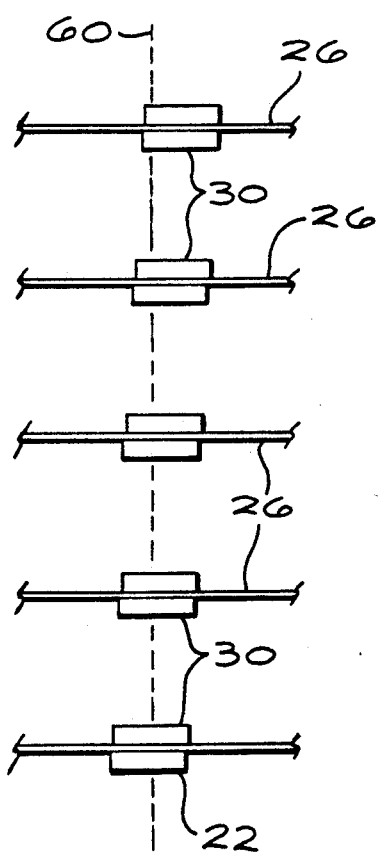
FIG. 4 is an enlarged schematic representation taken generally along the line 2—2 of FIG. 1, illustrating an exemplary effect of mechanical thermal expansion on the positioning of data heads relative to a selected cylinder address (illustrated by a dotted vertical line)
Figure 5:
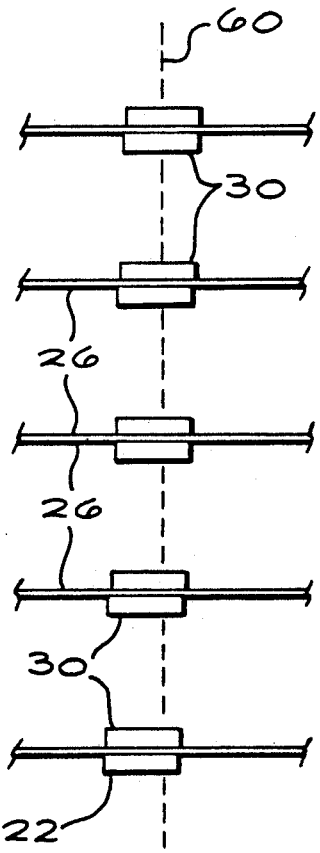
FIG. 5 is an enlarged schematic representation similar to FIG. 4, illustrating the manner in which thermal offset compensation is effected in accordance with the present invention to compensate for the thermal expansion shown in FIG. 4.

FIG. 4 illustrates a typical data head offset pattern which may result from thermal expansion within the disk drive unit 20. As illustrated, the servo head 22 is aligned directly over a selected data track 54 on the servo surface 24. That selected data track 54 defines the selected cylinder address for aligned data tracks provided on each of the data surfaces 28 of the several disks 26. The cylinder address is indicated by the dotted line 60. The thermal offset compensation system of the present invention measures the offset of each data head 30 relative to a cylinder address 60, determines the average offset, and then shifts the entire stack of heads 30 and 24 in a direction which tends to null the calculated average offset. This is accomplished by effectively moving the position of the servo head 22 with respect to the selected servo data track 54 (see FIG. 5).

Figure 8:
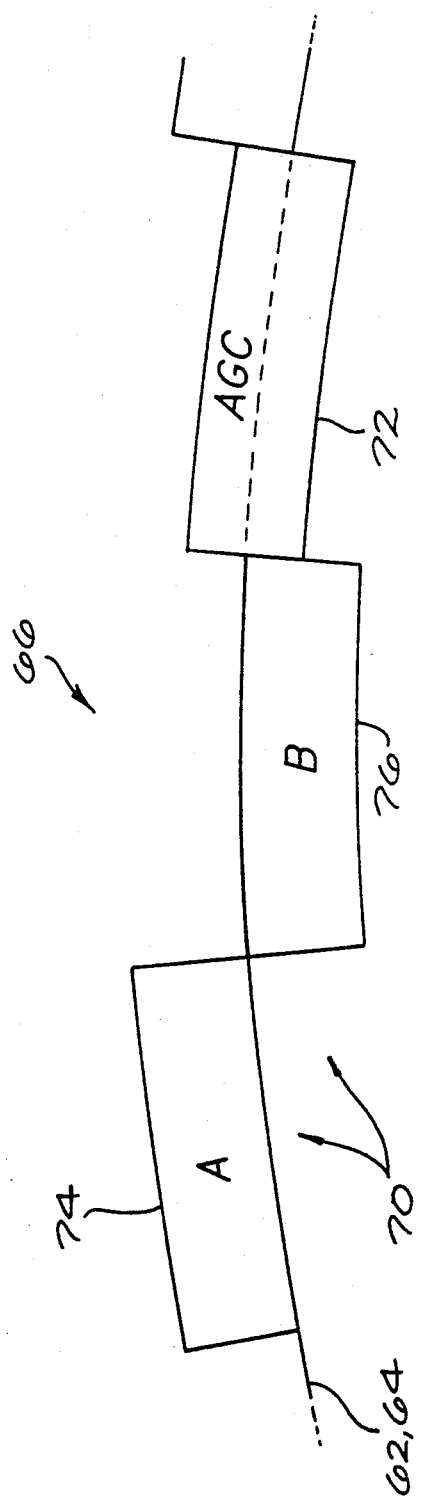
FIG. 8 is an enlarged schematic representation of a thermal offset compensation calibration track, illustrating a thermal burst pattern applied to each data storage surface at two dedicated cylinder addresses.
Figure 9:
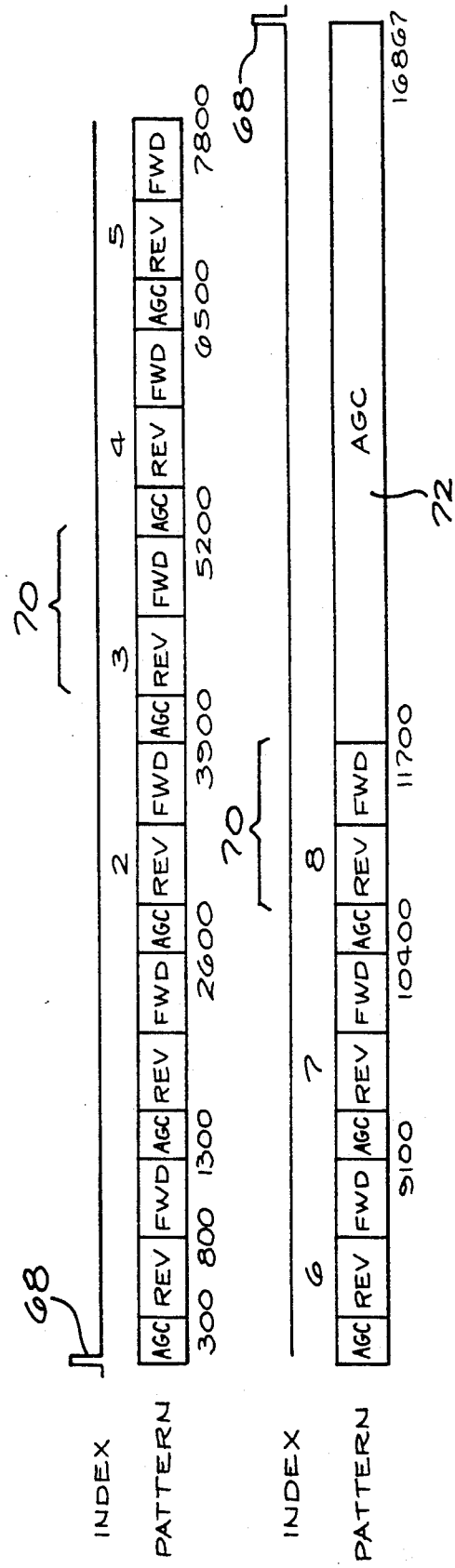
FIG. 9 is a flow chart illustrating a thermal compensation application subroutine responsive to parameters monitored during the spin-up operation and thereafter periodically during an idle mode.

Two cylinders are dedicated for determining the thermal offset of the data heads 30 relative to the servo head 22, and for calculating an offset compensation value. The first such cylinder is provided five cylinders into the outer guard band 36 and will hereafter be identified as the outer guard band calibration cylinder 62. The second such cylinder is four cylinders into the inner guard band 34 and will be referred to hereafter as the inner guard band calibration cylinder 64. With reference to FIGS. 8 and 9, a thermal burst pattern 66 is written onto each of the data tracks 54 comprising the inner and outer guard band calibration cylinder 62 and 64. As shown in FIG. 9, the pattern starts with an index mark 68 which signals the main data processor a beginning point for the calibration process. Following the index mark 68 are nine burst groups 70 followed by an AGC (adjusted gain control) pattern 72 to the end of the track. Each burst group 70 consist of a 300 microsecond AGC pattern 72 a 500 microsecond reverse offset pattern 74, and then a 500 microsecond forward offset pattern 76.

All nine burst groups 70 are applied to each data track 54 within the respective calibration cylinders 62 and 64, and each data head 30 reads, in sequence, only one of the burst groups 70 during the thermal offset compensation process. For example, the uppermost data head 30 is programmed to read the "zero" burst group and then the second uppermost data head is programed to read the "one" burst group and so forth until the data head adjacent to the servo head 22 reads the "nine" burst group. In this manner the offsets of all heads 30 are measured in one revolution of the disks 26. The system controller 50 compares the difference between the reverse pattern level and the forward pattern level of one burst group 70 per head 30. The AGC pattern 72 conditions the signal between the burst groups 70. The sum of the differences is used as an indication of the thermal related average head offset of the data heads 30 relative to the calibration cylinder 62 or 64. The thermal compensation system of the present invention applies some position offset compensation value to reduce the average head offset. There is no thermal compensation attempted for each individual head 30.

Figure 6A:
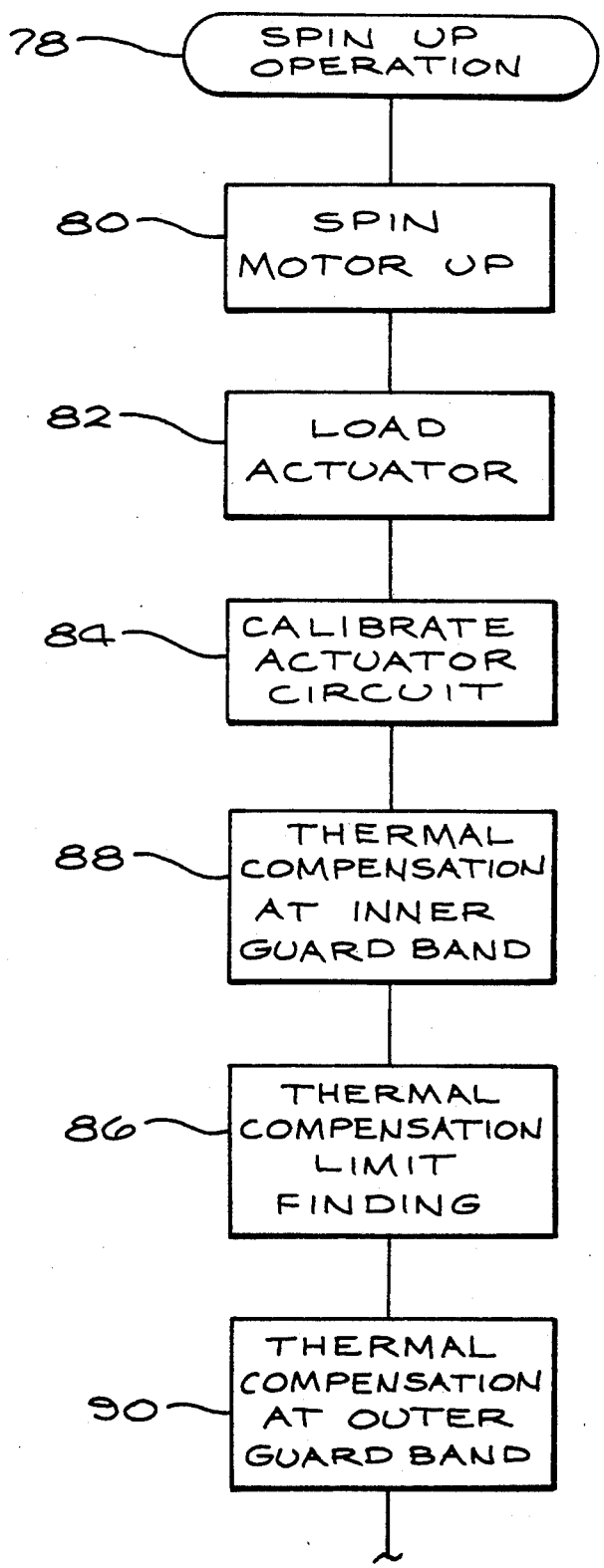
FIGS. 6A and 6B collectively show a flow chart illustrating, generally, the thermal offset compensation process of the present invention, including thermal offset compensation during spin-up of the high density disk drive unit (FIG. 6A) and periodically during an idle mode (FIG. 6B)
Figure 6:
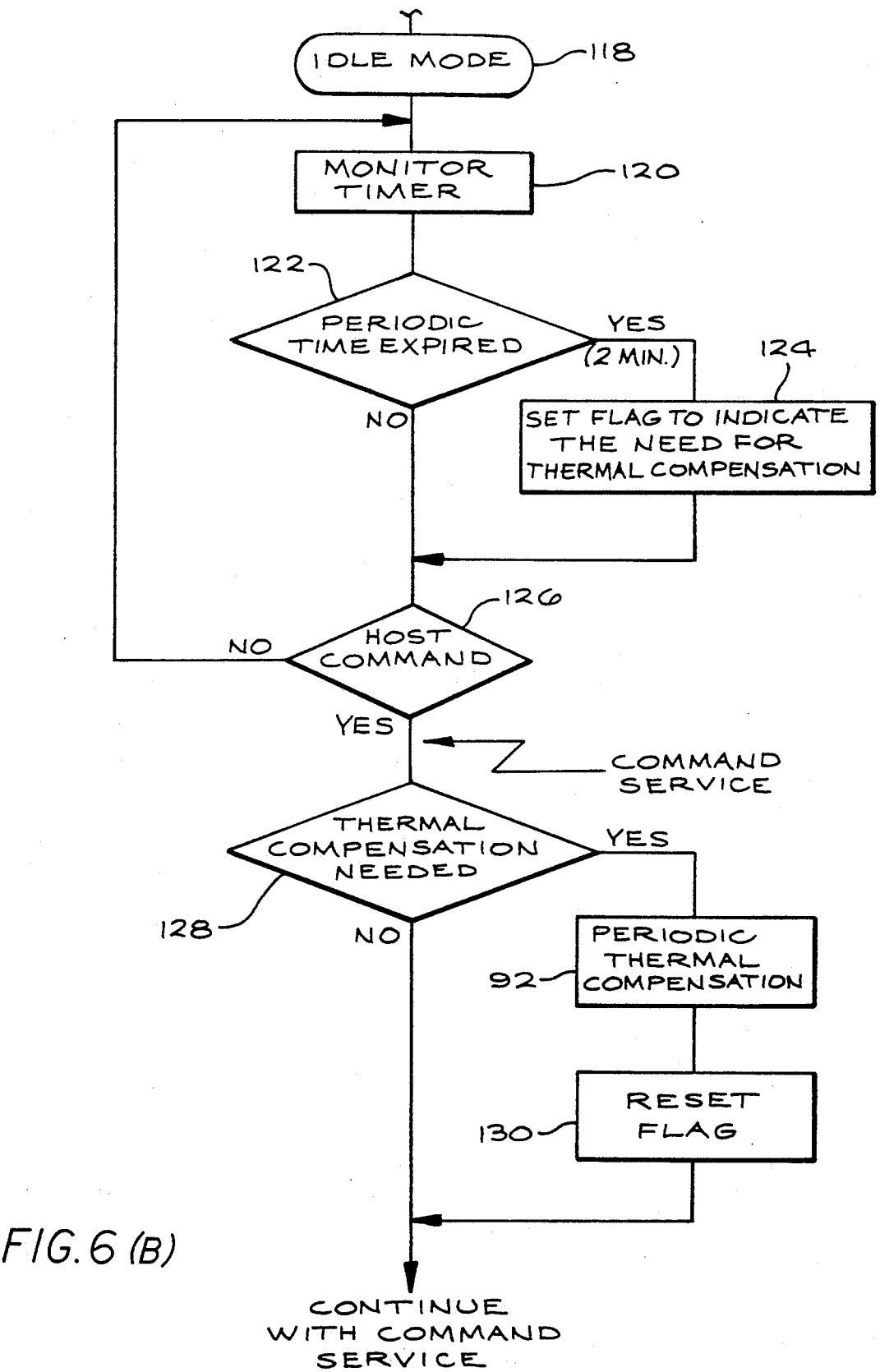

With reference to FIG. 6(A), thermal offset compensation in accordance with the present invention begins during a spin-up operation 78 of the disk drive unit 20. The spin-up operation 78 includes the steps of spinning-up the spindle motor (illustrated by block 80), loading the actuator (block 82) and calibrating the actuator circuit (block 84). The initial calibration procedure is activated during the actuator load operation 82. The initial calibration establishes three parameters: the thermal compensation limit (block 86); the thermal compensation value at the inner guard band (block 88); and the thermal offset compensation value at the outer guard band (block 90).

The thermal offset limit is a measured value that establishes the minimum average thermal offset required to initiate a thermal offset calibration step. It is set at the average value generated by a position offset of a half DAC 1 count. In the exemplary system, a DAC 1 count is approximately 15 micro-inches. The DAC 1 count is, more particularly, the minimum discrete incremental distance through which data head movement is controlled. The thermal offset compensation value at the inner guard band is the DAC 1 value that nulls the average thermal offset measured on the inner guard band calibration cylinder 64. The thermal offset compensation value at the outer guard band is the DAC 1 value that nulls the average thermal offset measured on the outer guard band calibration cylinder 62.

The thermal offset limit measurement 86 is done on the inner guard band calibration cylinder 64 by first measuring the average thermal offset of the data heads 30 relative to the calibration cylinder, and then moving the servo head 22 in a manner compensating for the calculated thermal offset. Next, the DAC 1 value is changed by four counts (approximately 60 micro-inches) in the reverse direction. The average offset of the data heads 30 is then measured once again with respect to the inner calibration cylinder 64 and divided by eight to determine the thermal offset limit. The thermal offset compensation value measurement at both the inner and outer guard band calibration cylinders 62 and 64 is accomplished in the same manner.

Figure 7:
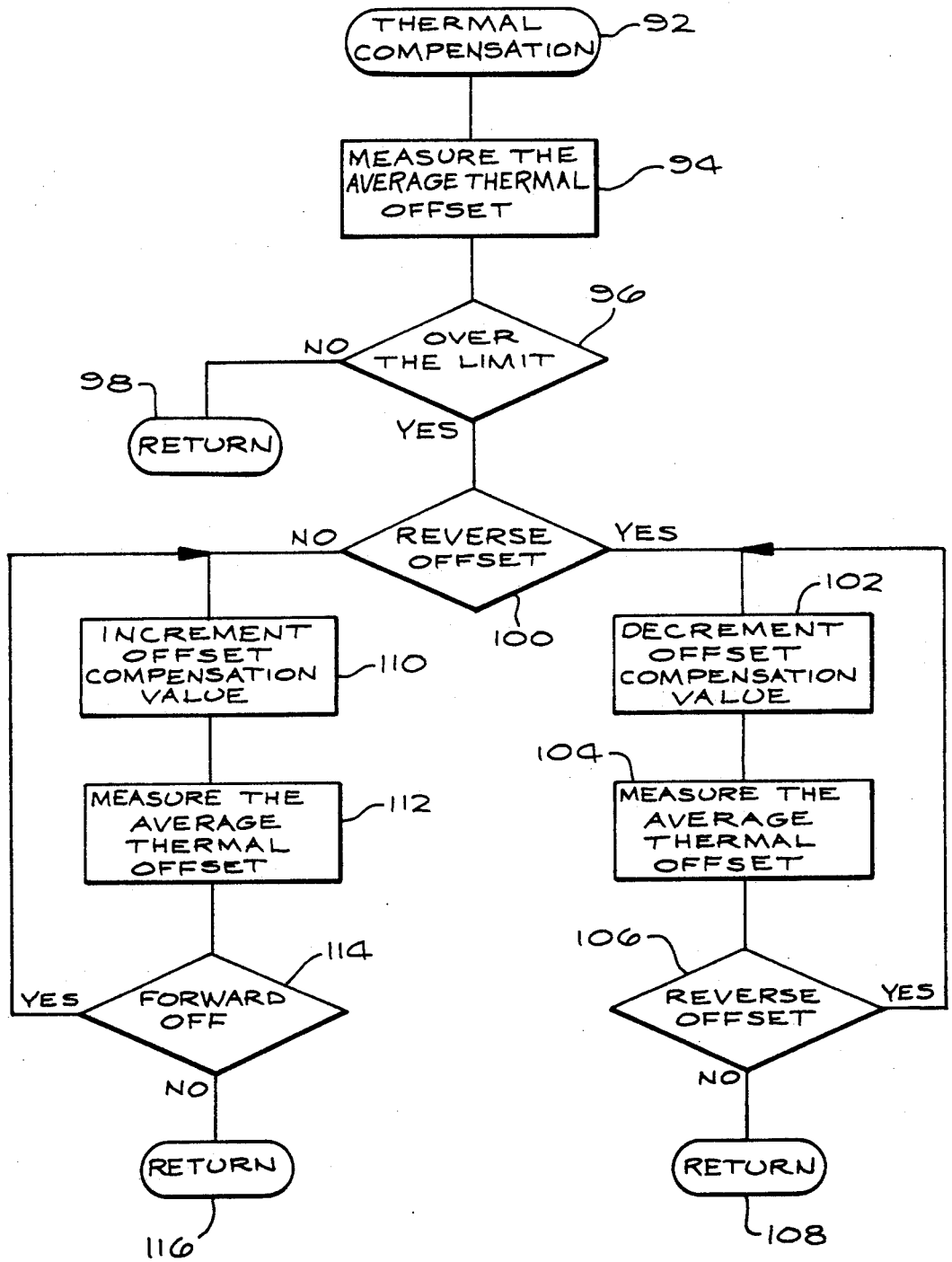

With reference to FIG. 7, the thermal compensation procedure 92 requires first a measurement of the average thermal offset (block 94) of the data heads 30 relative to the calibration cylinders 62 and 64. If a measured average offset is less than the thermal compensation limit (see 96), then the thermal compensation procedure 92 is terminated (block 98) since it is unnecessary. However, if a measured offset is greater than the thermal offset limit, one of two loops is followed. If a reverse offset is found (see 100), then a decrement offset compensation value (clock 102) is applied to the servo head 22 relative to the servo surface 24 in the value of DAC The average thermal offset is then immediately measured (block 104) after the application of this decrement DAC 1 value and if a reverse offset is detected once again (see 106), then another decrement DAC 1 value is added. This process is repeated until a reverse offset is no longer detected, which indicates that the average thermal offset had been nulled. At that point, the thermal compensation procedure 92 is terminated at a return step 108.

The second loop operates in a similar manner as that just described. If the initial average thermal offset is over the thermal offset limit and a reverse offset is not determined, the second loop operates to place an increment offset compensation value of DAC 1 to the servo head 22 relative to the servo surface 24 to attempt to null the detected offset (block 110). As described above in connection with the first loop, after each application of an increment DAC 1 value, the average thermal offset is measured (block 112) to determine whether a forward offset still exists (see 114). If so, the process is repeated. The loop is only exited once a forward offset is no longer detected. The thermal compensation process is then terminated at a return step 116.

After thermal compensation values have been determined at both the outer guard band calibration cylinder 62 and the inner guard band calibration cylinder 64, those values are applied to the servo head 22 relative to the servo tracks during operation of the disk drive unit 20. It has been found, however, that the offset values determined may differ between the inner and outer guard bands. In this case, the calibration data from the inner and outer guard band calibration cylinders 62 and 64 are applied utilizing a linear regression technique. This permits the offset applied to data tracks near the inner guard band 34 to more closely resemble the value determined at the inner guard band calibration cylinder 64, and, conversely, the offset value applied to the servo head at data tracks adjacent to the outer guard band 36 to more closely resemble the calculated offset value at the outer guard band calibration cylinder 62.

After the initial or spin-up calibration operation 78, the thermal offset compensation system enters an idle mode 118. (See FIG. 6B) During the idle mode, a timer is monitored (block 120) and a periodic calibration procedure is activated every two minutes. More particularly, during the idle mode 118, the system controller counts index marks 68. When the index mark is detected, a count is decremented. When the count is zero or less (see 122), the system controller sets up a calibration pending flag (block 124). The actual calibration procedure during the idle mode takes place only when a command from the interface is serviced (See 126). Based on the guard band select flag the thermal offset compensation procedure is done on the selected calibration cylinder 62 or 64.

Initially, a flag will be set such that during the idle mode 118 offset measurements will be taken first at the outer guard band calibration cylinder 62. The outer guard band offset compensation procedure measures the DAC 1 value that nulls the average thermal offset measured on the calibration cylinder 62. The thermal compensation procedure is identical to that explained in connection with FIG. 7. Once any host command is received after the periodic time has expired, a determination is made whether thermal compensation is needed (see 128). If not, the disk drive unit merely continues with command service. However, if it is determined that thermal compensation is needed (the measured average offset is greater than the initial measured offset), then periodic thermal differences in compensation is effected. In other words, if the measured values is less than or equal to the thermal offset limit, the calibration procedure is terminated and command service is resumed (block 98). If, however, the difference in measured values is greater than the thermal offset limit, the thermal compensation procedure of FIG. 7 is followed. Once the average offset has been nulled, the guard band select flag is reset (block 130) to select the inner guard band calibration cylinder 64 the next time thermal compensation is required.

At this point the idle mode process 118 begins anew. The timer is monitored to insure that at least a two minute time period has expired before the compensation procedure can be initiated. Once the periodic time has expired, the time flag is set to indicate the need for thermal compensation. Upon receipt of a host command, the inner guard band calibration cylinder 64 is utilized to determine the average offset of the data heads 30. If the difference in the average offset between the current and previous measurement exceeds the thermal offset limit, then the thermal compensation procedure shown in FIG. 7 is initiated, following which the guard band select flag is reset to next select the outer guard band calibration cylinder.

From the foregoing it is to be appreciated that the thermal offset compensation system of the present invention provides a method of compensating for thermally induced offsets of a plurality of data heads relative to a selected cylinder 60 of data tracks 54 on a plurality of computer disk memory storage surfaces 28 arranged in a stack for rotation about a common axis. The method includes the steps of measuring the offset of each data head 30 relative to an inner guard band calibration cylinder 64, and measuring the offset of each data head relative to an outer guard band calibration cylinder 62 during a spin-up operation 78 of the disk storage surfaces. The average offset of the data heads taken collectively is then determined, and a minimum incremental DAC value is also determined for collectively adjusting the data heads. The data heads 30 are then shifted, collectively, relative to a selected cylinder to null the average offset determined. This is accomplished by adjusting the position of the servo head 22 relative to a selected track on the servo surface.

During the initial spin-up procedure 78, the difference in the average offsets of the data heads at the inner and outer guard band calibration cylinders 62 and 64 is determined, and a linear regression technique is utilized to adjust shifting of the heads relative to a selected cylinder. Thereafter, during an idle mode 118, the offset of the data heads relative to a calibration cylinder is measured only after the expiration of a predetermined time period and upon receipt of a host command by the disk drive unit 20.

The thermal offset compensation system of the present invention is useful particularly in dedicated servo surface hard disk drive systems, and minimally impacts the speed efficiency of the computing system. Further, the system of the present invention is relatively simple and operates automatically to minimize thermal expansion-induced read/write errors.

Although a particular embodiment of the invention has been described for purposes of illustration, various modifications may be made without departing from the spirit and scope of the invention. Accordingly, the invention is not to be limited, except as by the appended claims.

What is claimed is:

1. In a disk drive unit, a method of compensating for thermally induced offsets of a plurality of data heads relative to a selected cylinder of data tracks on a plurality of computer disk memory storage surfaces arranged in a stack for rotation about a common axis, the method comprising:

measuring the offset of each data head relative to an inner guard band calibration cylinder, and measuring the offset of each data head relative to an outer guard band calibration cylinder during a spin-up operation of the disk storage surfaces;

determining the average offset of the data heads taken collectively;

shifting the data heads, collectively, relative to a selected cylinder to null the average offset determined;

periodically measuring the offset of each data head relative to the inner or outer guard band calibration cylinders, after the spin-up operation of the disk storage surfaces;

determining a minimum incremental unit value for collectively adjusting the data heads during the shifting step, wherein the average offset of the data heads is re-determined and applied to the data heads relative to the selected cylinder to null the average offset determined, only when the average offset changes at least by the minimum incremental unit value; and setting a flag such that after the spin-up operation the average offset of the data heads is determined with respect to the outer guard band calibration cylinder until the average offset changes at least by the minimum incremental unit value, whereupon the flag is reset such that the average offset of the data heads is determined with respect to the inner guard band calibration cylinder until the average offset changes at least by the minimum incremental unit value, whereupon the flag is rest once again so that the average offset is determined with respect to the outer guard band calibration cylinder, and so forth.

2. A method as set forth in claim 1, including the steps of determining the difference in the average offsets of the data heads at the inner and outer guard band calibration cylinders, and utilizing a linear regression technique to adjust the shifting of the data heads relative to the selected cylinder.

3. A method as set forth in claim 1, wherein after the spin-up operation, the offset relative to a calibration cylinder is measured only after the expiration of a predetermined time period, and upon receipt of a host command by the disk drive unit.

4. A method as set forth in claim 1, wherein the step of determining the average offset includes the steps of alternately collectively moving the data heads the minimum incremental unit value and then measuring the average offset of the data heads relative to the calibration cylinder until the average offset is nulled.

5. In a disk drive unit, a method of compensating for thermally induced offsets of a plurality of data heads relative to a selected cylinder of data tracks on a plurality of computer disk memory storage surfaces arranged in a stack for rotation about a common axis, the method comprising:

measuring the offset of each data head relative to an inner guard band calibration cylinder;

measuring the offset of each data head relative to an outer guard band calibration cylinder;

determining the average offset of the data heads taken collectively, including the steps of alternately collectively moving the data heads a minimum incremental unit value and then measuring the average offset of the data heads relative to the selected calibration cylinder until the average offset is nulled;

shifting the data heads, collectively, relative to the selected cylinder to null the average offset determined;

periodically measuring the offset of each data head relative to the inner or outer guard band calibration cylinders after the initial average offset of the data heads has been determined; and alternating measurement updates from either one or the other of the inner and outer guard band calibration cylinders.

6. A method as set forth in claim 5, including the steps of determining the difference in the average offsets of the data heads at the inner and outer guard band calibration cylinders, and utilizing a linear regression technique to adjust the shifting of the data heads relative to the selected cylinder.

7. A method as set forth in claim 5, wherein with respect to the step of periodically measuring the offset of each data head relative to the inner or outer guard band calibration cylinders after the initial average offset of the data heads has been determined, such subsequent measurement of the offset occurs only after the expiration of a predetermined time period and upon receipt of a host command by the disk drive unit, wherein the average offset of the data heads is re-determined and applied in shifting the data heads relative to the selected cylinder to null the average offset determined, only when the average offset changes at least by the minimum incremental value.

8. A method as set forth in claim 5, including the step of setting a flag such that after the initial average offset has been determined, the average offset of the data heads is measured with respect to the outer guard band calibration cylinder until the average offset changes at least by the minimum incremental unit value, whereupon the flag is reset such that the average offset of the data heads is determined with respect to the inner guard band calibration cylinder until the average offset changes at least by the minimum incremental unit value, whereupon the flag is then reset to require determination of the offset at the outer guard band calibration cylinder, and so forth.

9. In a disk drive unit, a method of compensating for thermally induced offsets of a plurality of data heads relative to a selected cylinder of data tracks on a plurality of computer disk memory storage surfaces arranged in a stack for rotation about a common axis, the method comprising:

measuring the offset of each data head relative to an inner guard band calibration cylinder;

measuring the offset of each data head relative to an outer guard band calibration cylinder;

determining the average offset of the data heads taken collectively, including the steps of alternately collectively moving the data heads a minimum incremental unit value and then measuring the average offset of the data heads relative to the selected calibration cylinder until the average offset is nulled;

shifting the data heads, collectively, relative to the selected cylinder to null the average offset determined;

periodically measuring the offset of each data head relative to the inner or outer guard band calibration cylinders after the initial average offset of the data heads, taken collectively, has been determined, wherein such subsequent measurement of the offset occurs only after the expiration of a predetermined time period and upon receipt of a host command by the disk drive unit, wherein the average offset of the data heads is re-determined and applied in shifting the data heads relative to the selected cylinder to null the average offset determined, only when the average offset changes at least by the minimum incremental value; and setting a flag such that after the initial average offset has been determined, the average offset of the data heads is measured with respect to the outer guard band calibration cylinder until the average offset changes at least by the minimum incremental unit value, whereupon the flag is reset such that the average offset of the data heads is determined with respect to the inner guard band calibration cylinder until the average offset changes at least by the minimum incremental unit value, whereupon the flag is then reset to require determination of the offset at the outer guard band calibration cylinder, and so forth.

10. A method as set forth in claim 9, including the steps of determining the differences in the average offsets of the data heads at the inner and outer guard band calibration cylinders, and utilizing a linear regression technique to adjust the shifting of the data heads relative to the selected cylinder.

* * * * *